May 23, 1939.　　　T. H. DE SPAIN　　　2,159,688
SEWING MECHANISM
Filed May 17, 1938　　　11 Sheets-Sheet 1
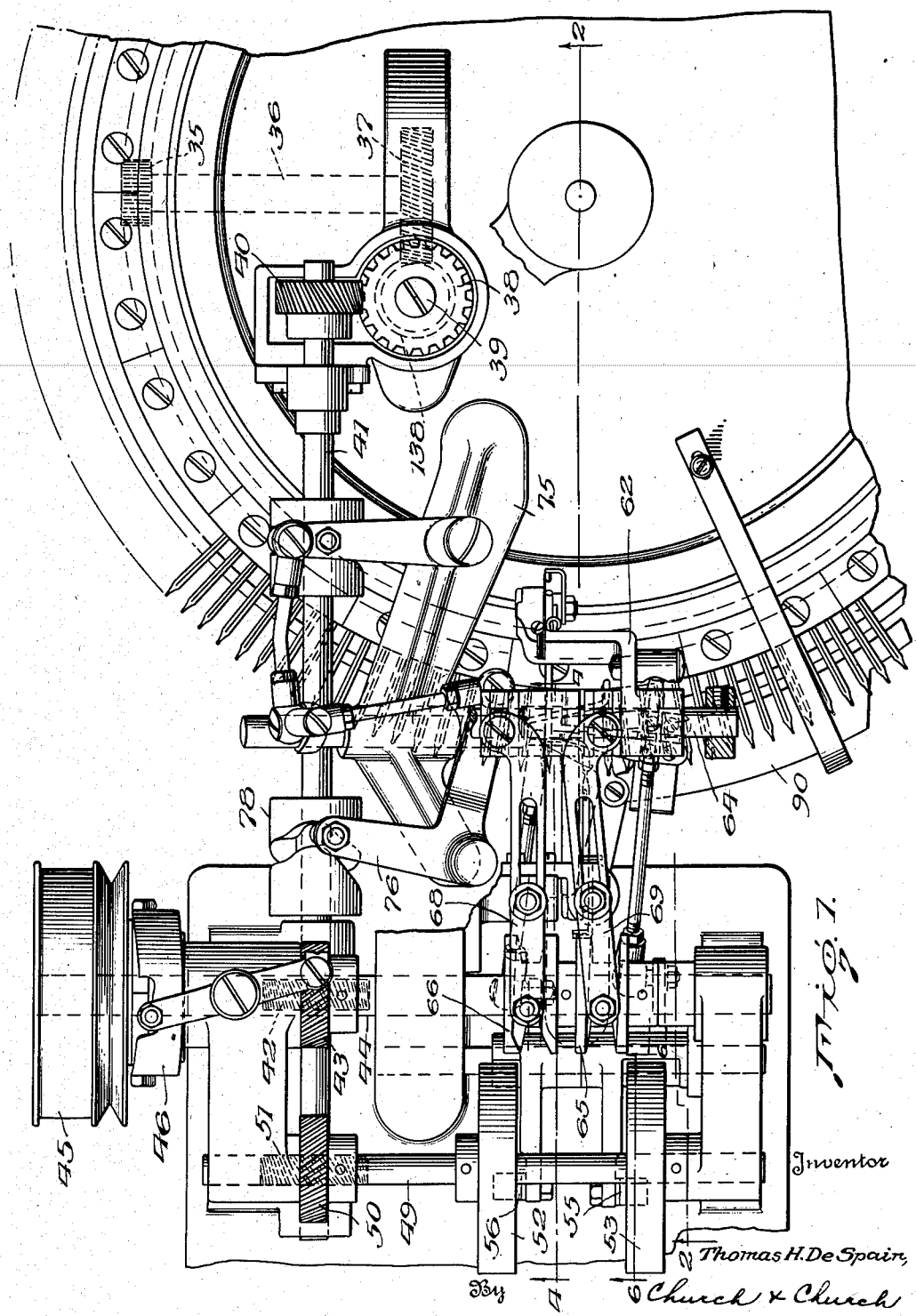

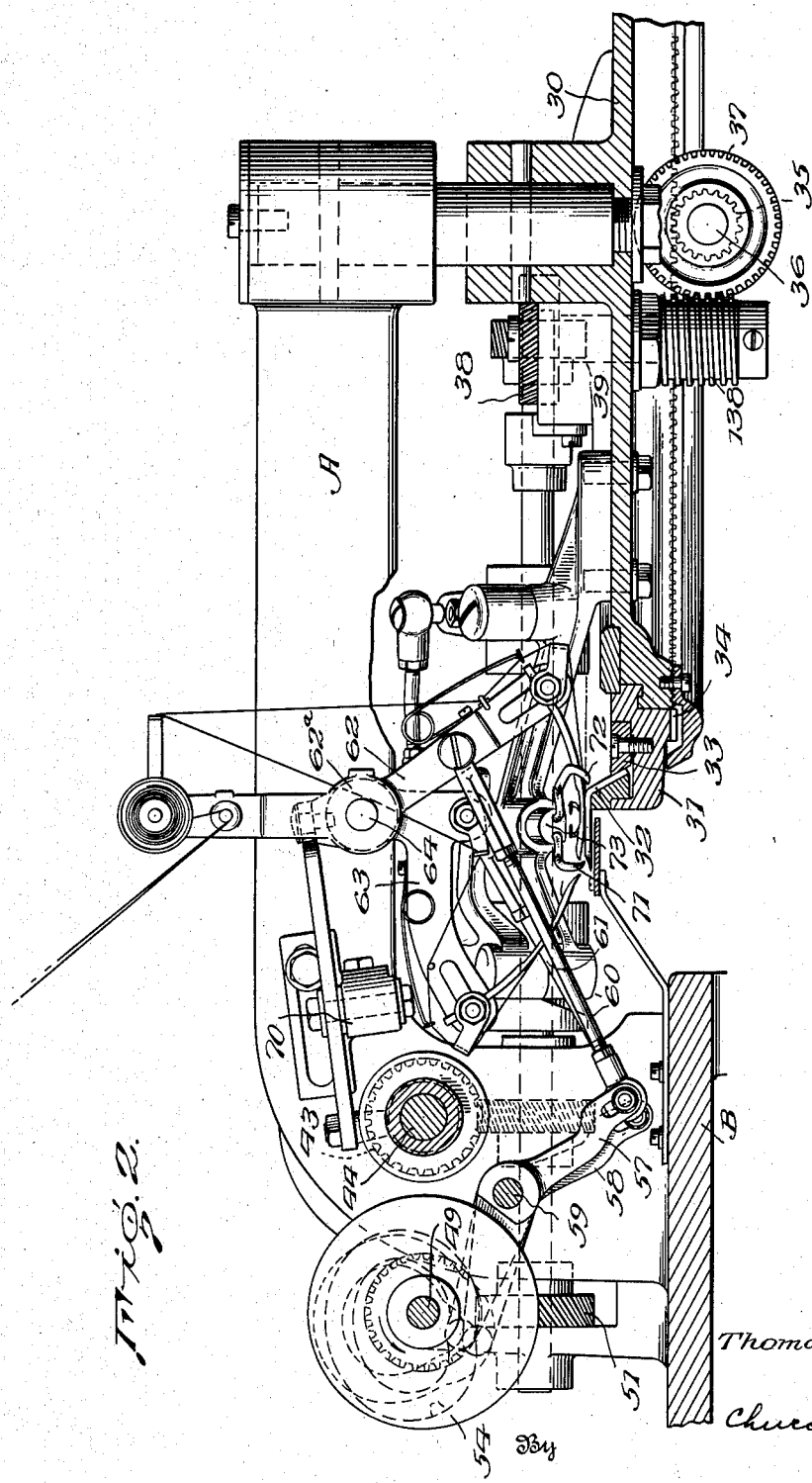

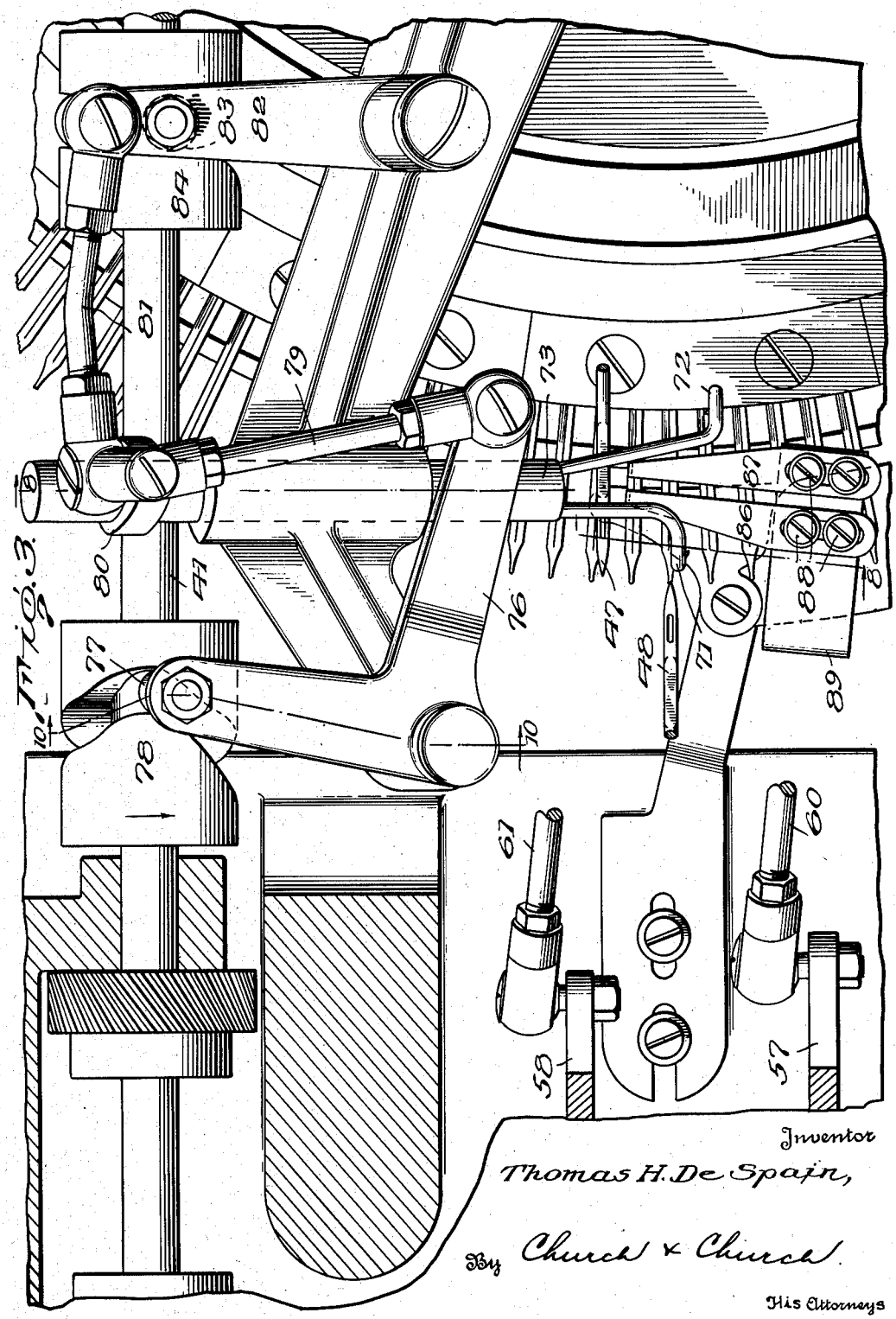

May 23, 1939.　　T. H. DE SPAIN　　2,159,688
SEWING MECHANISM
Filed May 17, 1938　　11 Sheets-Sheet 4
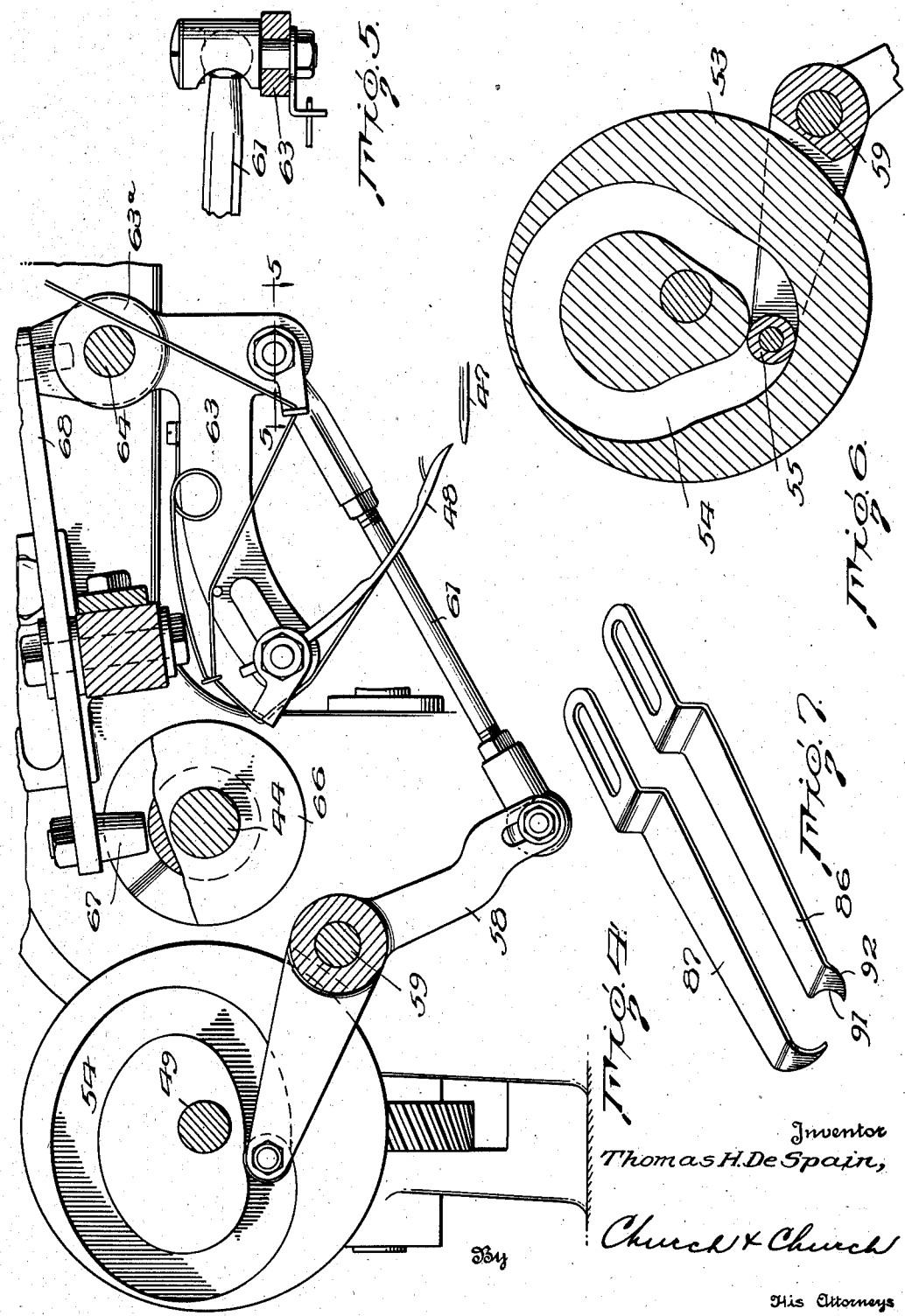

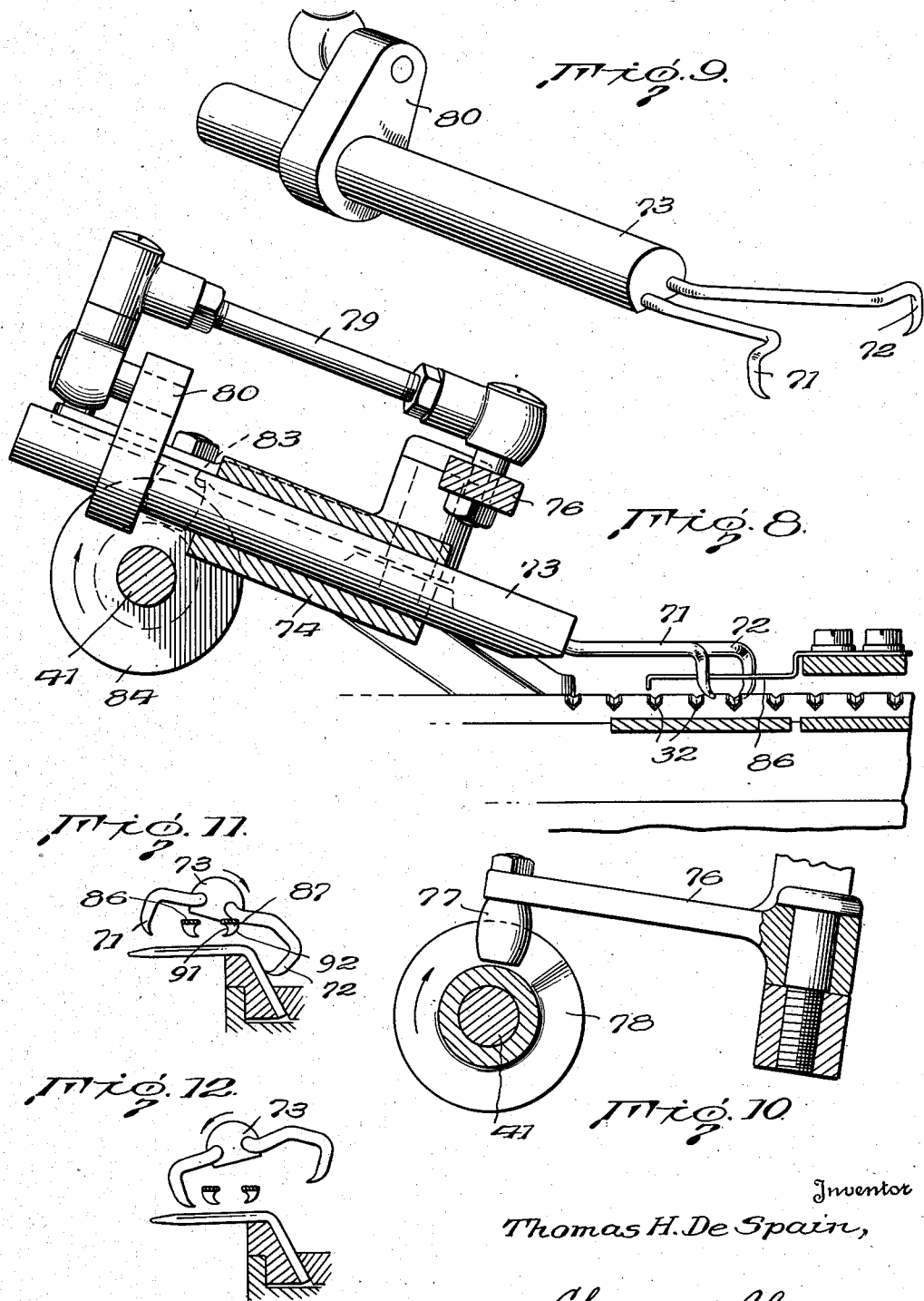

May 23, 1939.   T. H. DE SPAIN   2,159,688
SEWING MECHANISM
Filed May 17, 1938   11 Sheets-Sheet 6

Inventor
Thomas H. De Spain,

By Church & Church
His Attorneys

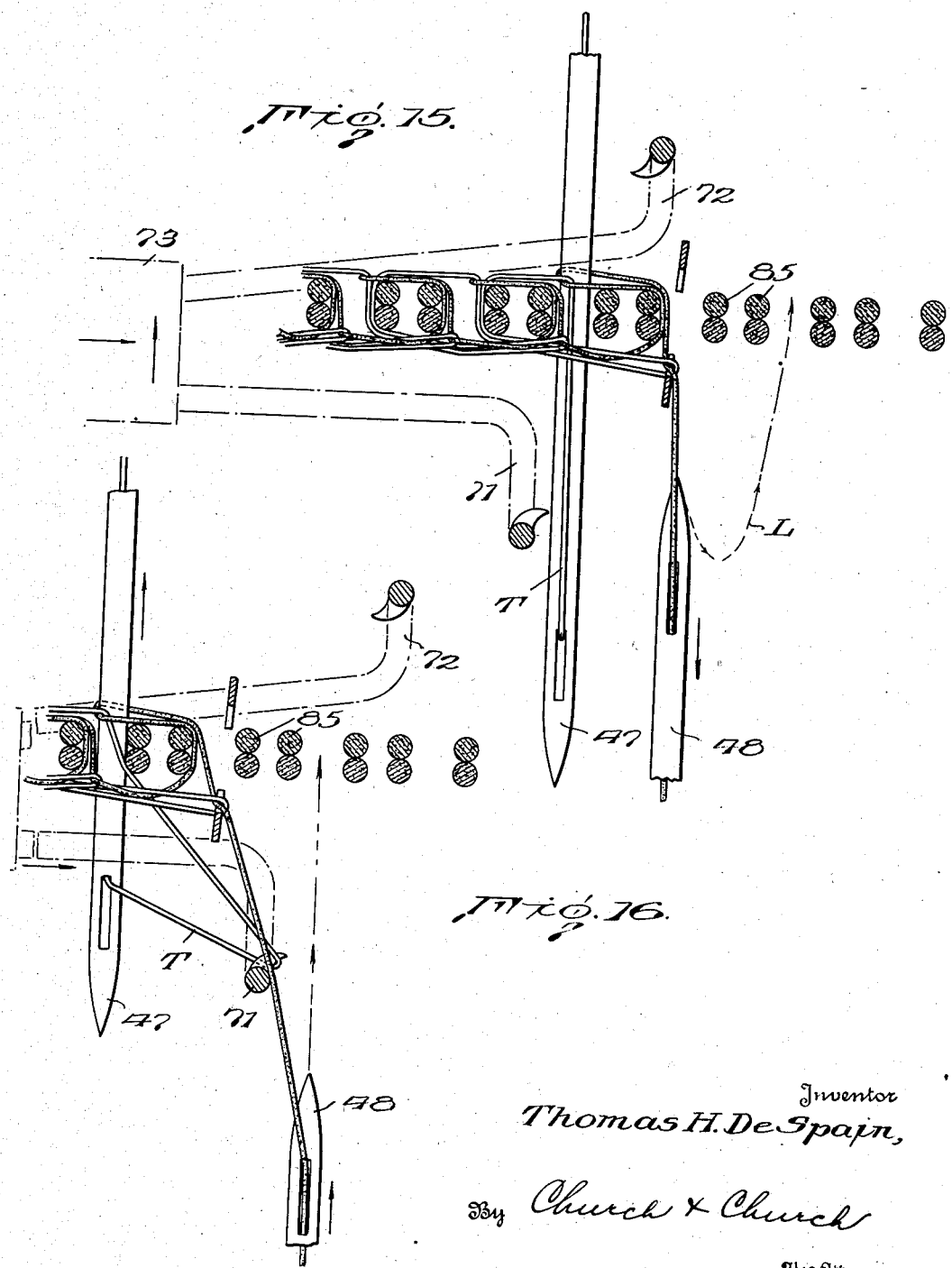

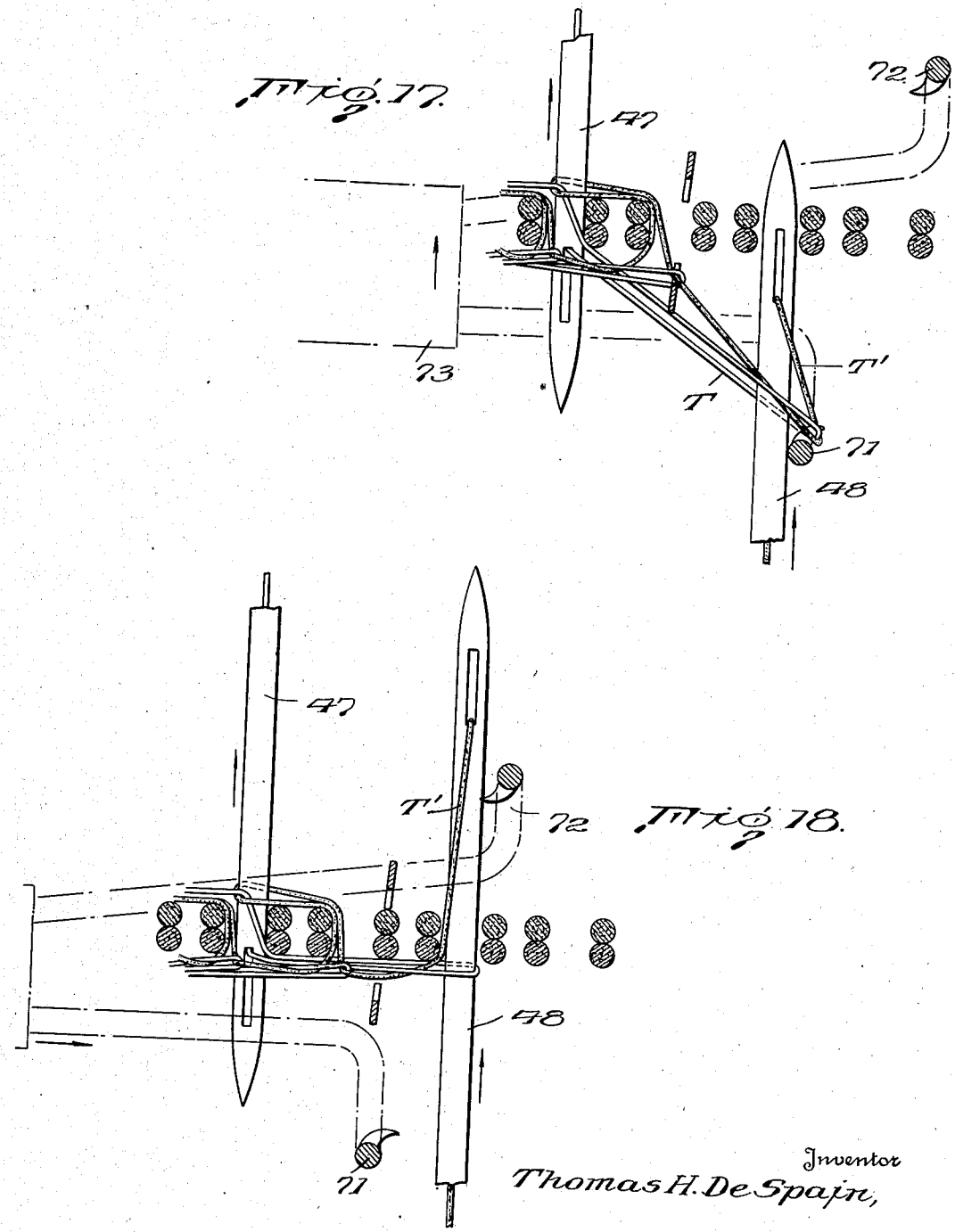

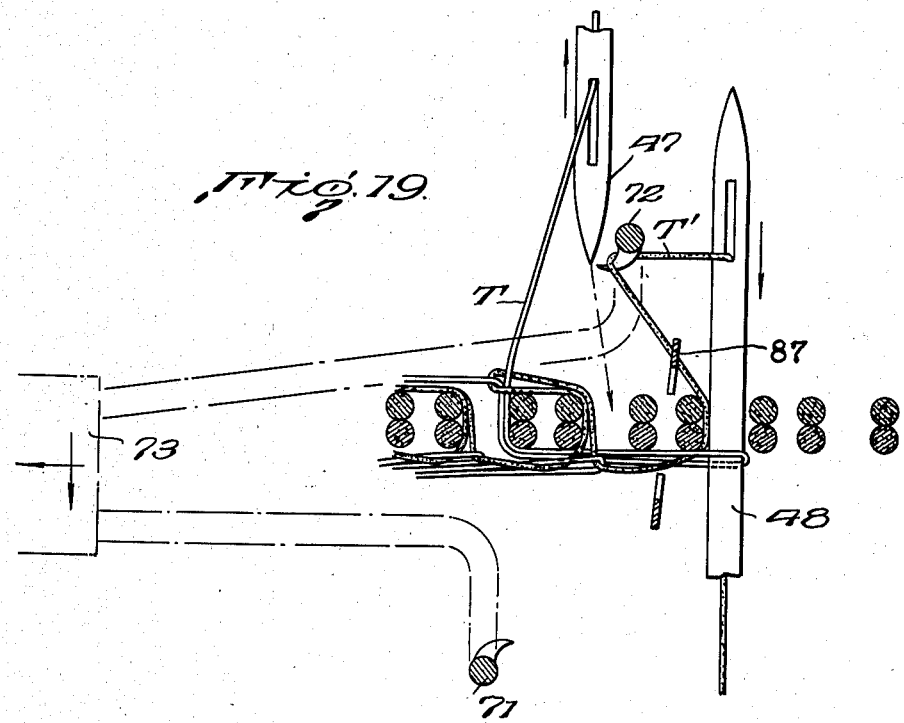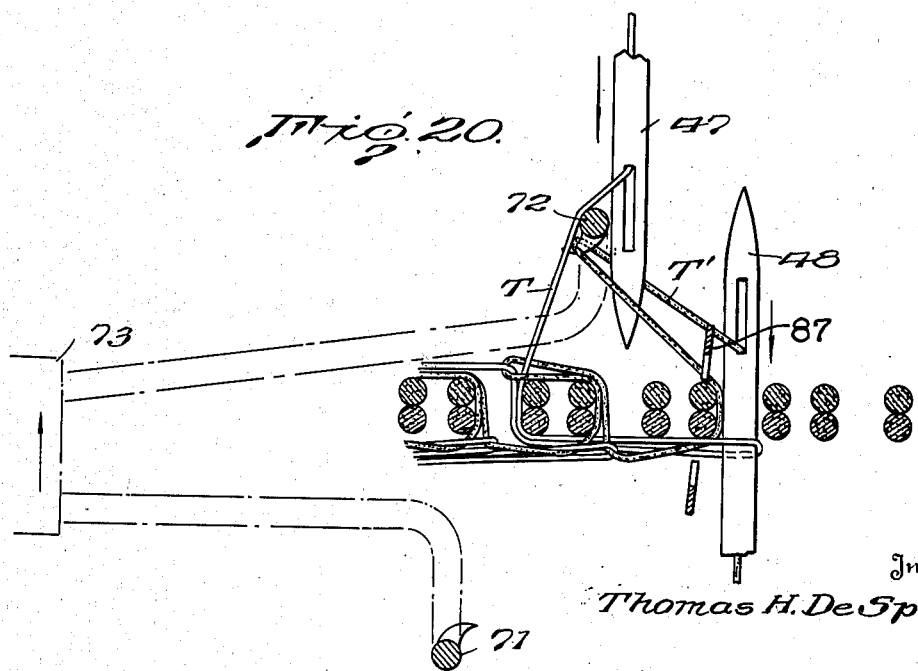

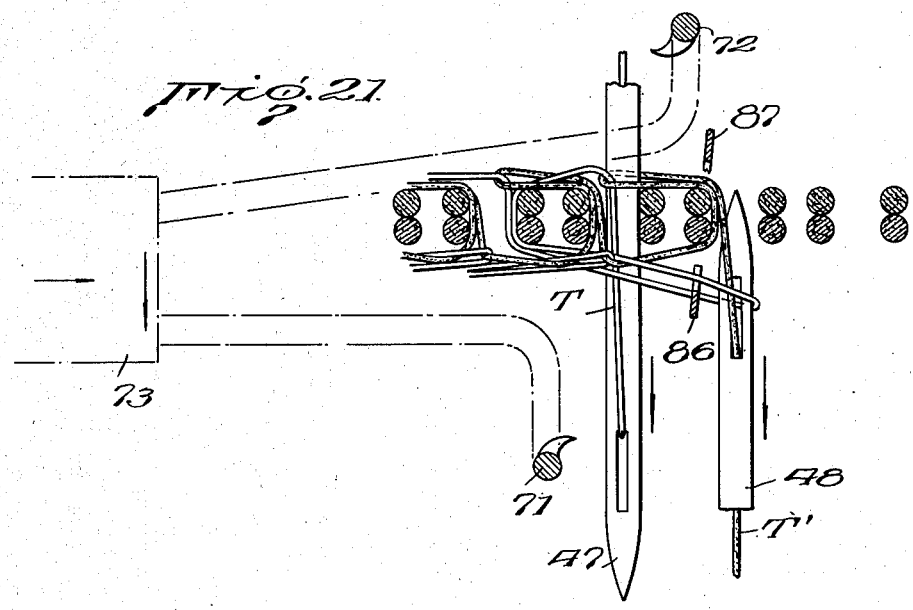
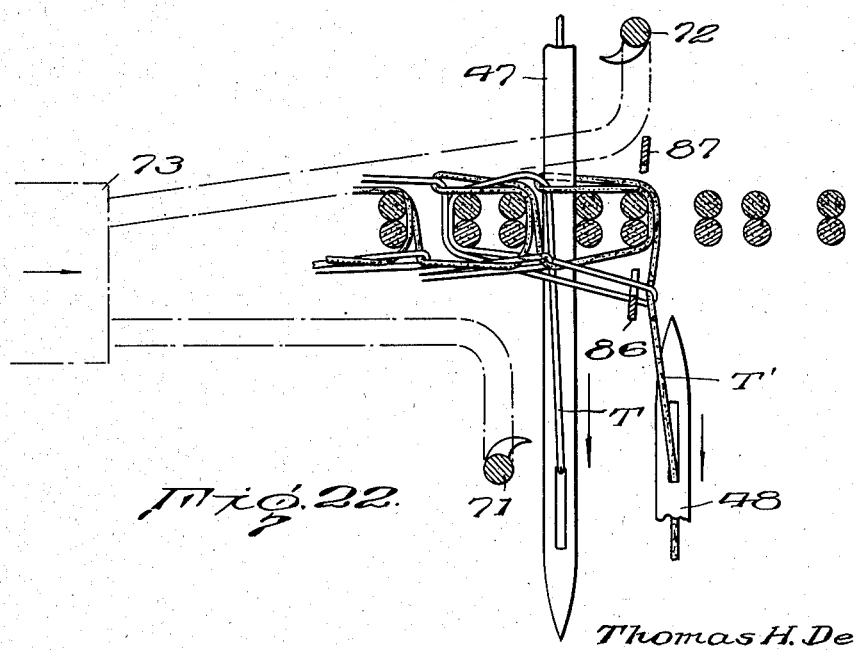

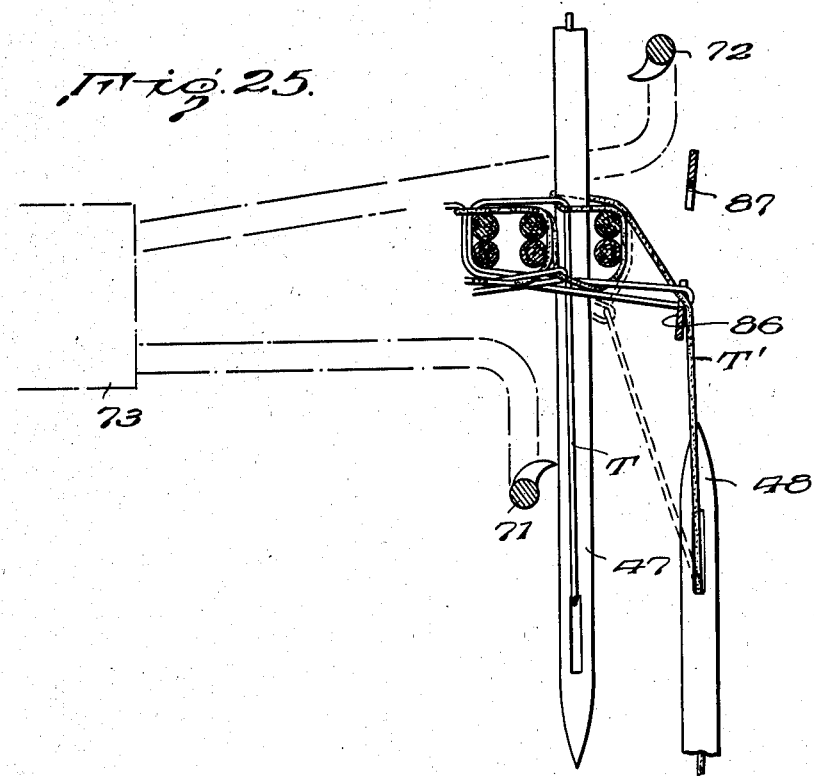
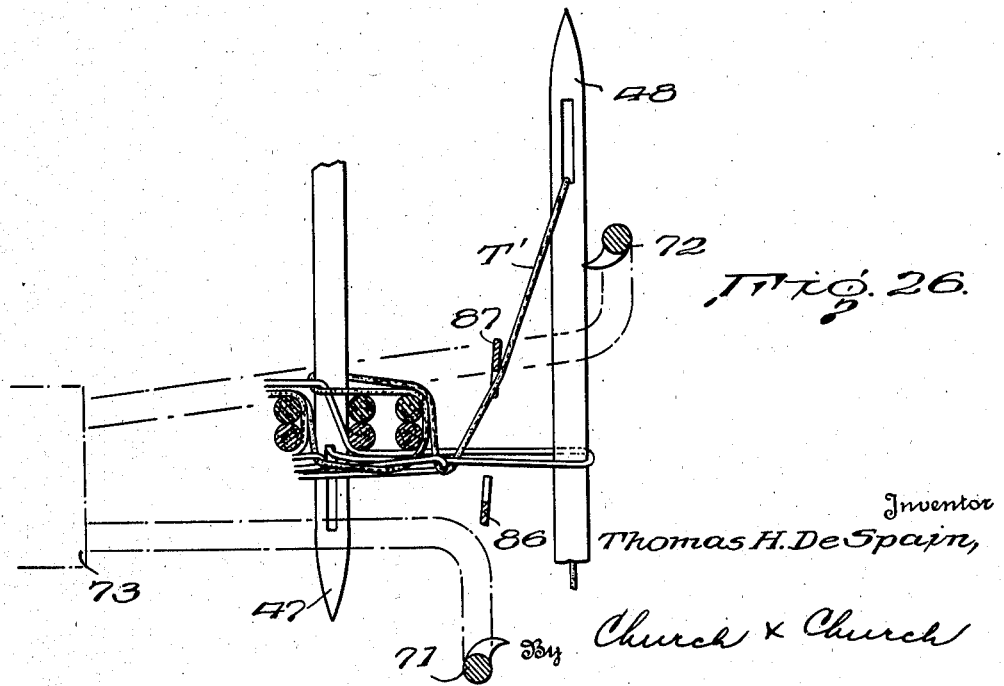

Patented May 23, 1939

2,159,688

UNITED STATES PATENT OFFICE 2,159,688

SEWING MECHANISM

Thomas H. De Spain, Paducah, Ky., assignor to Southern Textile Machinery Company, Paducah, Ky., a corporation of Kentucky Application May 17, 1938, Serial No. 208,465

15 Claims. (Cl. 112—25)

This invention relates to improvements in sewing machines and, particularly, to machines commonly referred to as dial loopers generally used for uniting sections or pieces of knitted materials.

Primarily, the object of the invention is to provide a sewing mechanism for a machine of this type adapted for use in connection with uniting fabric materials. Briefly, these machines comprise a series of work-supporting elements, known as work points, usually carried on a continuously revolving dial so that the points are successively moved past the thread-carrying needles of the sewing mechanism. The loops of yarn or other thread, of which the materials to be united are formed, are placed on these so-called work points and, as the points successively pass the thread-carrying needles, of which there are two, the needles are advanced and retracted through the work loops on the points from opposite sides of the work loops. One needle is retracted while the other is advanced and, as each needle is advanced through the work, looper devices form a loop in the thread of the advanced needle. At this time, the other needle is in retracted position and is then advanced through the thread loop before penetrating the work. As will be appreciated, where comparatively fine-meshed goods are being united, the work points must necessarily be positioned very close to one another and, in addition, they must be comparatively thin so that the needles of the sewing mechanism are also necessarily of small cross-section—so much so that they are exceedingly flexible. As a result, means must be provided for forming loops in the needle threads in such fashion as to be certain not to flex the needles or, otherwise, the needles will not register with the work-supporting points, a condition that must be maintained because of the fact that the work points are constantly moving, as distinguished from an intermittent movement, and it is absolutely necessary that the needles be alined or in registry with the work points at all times or, otherwise, the needle will not enter the loops of the knitted fabrics on the work points. Specifically, therefore, another object of the invention is to provide a novel form of looper mechanism capable of being used in conjunction with needles of exceedingly small cross-section, in that the present looper mechanism will form the necessary loops in the needle threads without deflecting the needles so as to move the latter out of proper registry or alinement with the work-loop-supporting points.

As is also well known in the art to which the present invention relates, a number of pieces of work are usually on the work-point dial at the same time, the number of loops in, or the length of, each pair of mated pieces of material to be united seldom, if ever, corresponding to that of the entire series of work points on the dial. Successive pairs of mated pieces to be united are necessarily spaced somewhat from each other, circumferentially of the dial, and it is necessary to provide means for continuing the formation of normal stitches during the operation of the sewing mechanism while work points between pieces of work are passing the sewing mechanism. In machines of the prior art of comparatively wide gauge, i. e., where the work points are comparatively broad and are spaced sufficient distances apart, it has generally been the practice to provide what are known as jacks in the form of elements that are adapted to project up through the spaces between contiguous work points, so as to restrain or limit the movement of the needle threads as the needles are advanced or retracted past the plane in which the work loops are normally positioned on the work points. This formation of stitches, in conjunction with the jacks, between successive pieces of work is what is known as "chaining off". The use of these so-called jacks, however, is dependent upon the presence of sufficient space to accommodate them between contiguous work points and another object of the present invention is to provide novel means for effecting this so-called "chaining off" operation in machines of the present type having comparatively small, closely spaced work points for use in connection with fine-meshed fabrics or, in other words, machines in which the work points are so closely spaced as not to permit the use of jacks for the "chaining off" operation.

More specifically, the invention contemplates the use of members which, for convenience, will be termed chain stitch fingers, rigidly or fixedly mounted, preferably above the work points, but offset downwardly to and slightly beyond the plane in which the needle threads are normally moved by their respective needles. These chain stitch fingers are located in positions where they will be at opposite sides of work loops that are on the points and will not interfere with the normal sewing operations but, in the absence of work loops on the work points, said fingers will limit the movement of the needle threads, substantially just the same as would the work loops if they were present and, thus, permit the continuous production of stitches in a chain-like formation until the next piece of work is brought into operative relationship with respect to the needles.

With these and other objects in view, the invention consists in certain details of construction and combinations and arrangements of parts, all as will hereinafter be more fully described, and the novel features thereof particularly pointed out in the appended claims.

In the accompanying drawings—

Figure 1 is a top plan view of a dial looper machine embodying the present improvements, but with portions of the dial omitted;

Fig. 2 is a vertical sectional view on the line 2—2 of Fig. 1;

Fig. 3 is a view similar to Fig. 1, but showing, on a somewhat enlarged scale, the stitch fingers and the looper mechanism, including the operating connections for the latter;

Fig. 4 is a vertical sectional view on the line 4—4 of Fig. 1;

Fig. 5 is a detail horizontal sectional view on the line 5—5 of Fig. 4;

Fig. 6 is a vertical sectional view on the line 6—6 of Fig. 1;

Fig. 7 is a detail perspective view of the two stitch fingers;

Fig. 8 is a vertical sectional view on the line 8—8 of Fig. 3;

Fig. 9 is a detail perspective view of the looper hooks and carrier therefor;

Fig. 10 is a vertical sectional view on the line 10—10 of Fig. 3;

Figs. 11 and 12 are detail views showing the looper hooks in end elevation, and illustrating the rocking motion of those members;

Figs. 15 to 22 are a series of similar views illustrating successive steps or positions in a complete cycle of operations of the sewing needles and loopers;

Figs. 25 and 26 are views similar to Figs. 15 and 19, illustrating the functioning of the chain stitch fingers in the absence of work on the work points.

Figure 13:
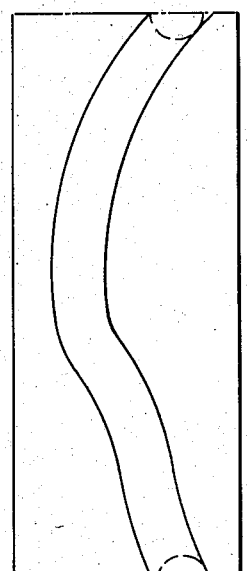
Fig. 13 is a diagrammatic view illustrating the contour of the cam surface by which the looper carrier is reciprocated in its mounting.
Figure 14:
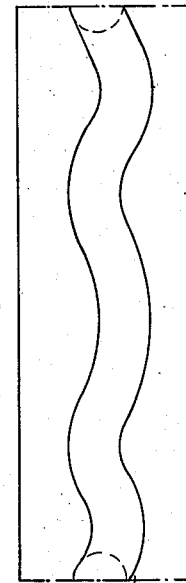
Fig. 14 is a similar view of the cam by which the looper carrier is rocked.

The machine disclosed, for the purposes of illustrating the present invention, is of the type shown in Patent No. 1,894,885, granted January 17, 1933. It is of the type commonly known as a dial looper and comprises a bed plate 30 mounted on a bracket arm A projecting from a base plate B which may be secured on any suitable support. This bed plate has revolubly mounted thereon the ring 31 in which the impaling pins, or work points, are mounted. The pins 32 are clamped in the ring 31 by plates 33 and, while these pins are shown rather widely spaced, this is merely for the purpose of more clearly illustrating the construction, it being understood that the invention is more especially adapted for the fine-point machine. On the under surface of the ring 31, there is formed a gear 34 by means of which the ring is revolved on the bed plate by a gear 35 mounted on shaft 36 which also carries a worm gear 37 meshing with a worm 138 on a stub shaft 39. Shaft 39 also carries a gear 38 meshing with a gear 40 on a shaft 41 and this shaft carries a gear 42 which meshes with a gear 43 on the drive shaft 44. Power is applied to shaft 44 by a pulley 45 which may be releasably engaged with the shaft by a clutch mechanism indicated at 46.

As usual, the sewing mechanism comprises two needles 47, 48, adapted to be advanced through loops of work on the work points 32 from opposite sides of the work and, in view of the fact that the ring 31 carrying the work points is of the continuously rotating type, as distinguished from the intermittent operation in some machines, the needles 47, 48, have a lateral step-over movement so that they will move in unison with the work points, while engaged with the work loops on the points. The needle-actuating mechanism comprises a shaft 49 journaled in suitable bearings on base plate B and carrying a gear 50 in mesh with a gear 51 on shaft 41. Also mounted on shaft 49 are two cam discs 52, 53, having cam slots 54 adapted to receive cam rollers 55, 56, journaled on one arm of cam levers 57, 58, respectively. These cam levers 57, 58, are pivoted on a shaft 59. The other arms of cam levers 57, 58, have attached thereto connecting rods 60, 61, which, in turn, are attached to needle arms 62, 63, pivotally and slidably mounted on a shaft 64. The contour of the cam slots 54 in the cam discs 52, 53, is such that the needle arms carrying the needles 47, 48, will be rocked on shaft 64 to advance and retract them longitudinally of the work points 32, the needles being adapted to pass through loops in the work if and when the work is present on the work points. To impart the lateral, step-over movement to the needles to move them in unison with the work points, there are mounted on the drive shaft 44 two cam members 65, 66, with which cam rollers 67 on rocker arms 68, 69, engage. The rocker arms 68, 69, are pivoted on an arm 70 projecting laterally from the bracket A and said rocker arms are connected to the hub portions 62a, 63a, of the needle arms. Thus, the varying contours of cams 65, 66, will, by means of rocker arms 68, 69, slide or reciprocate the needle arms 62, 63, axially of shaft 64, the timing of these sliding movements of the needle arms being so related to the advance and retractive motions of the needle arms that the sliding motions will occur at times when the needles are in engagement with the loops of work on the work points.

As will be hereinafter more fully described, the thread of each needle is adapted to be engaged at a time when the needle has advanced and carried its thread through the work or when the needle is in what is termed its advance position for the purpose of forming in that thread a loop and positioning that loop in the path of the other needle. At the time this loop is formed in said thread, the other needle is in its retracted position and is advanced through the loop formed in the needle thread prior to entering the loop of the work on the work points. For purposes which will presently appear, this looping of the threads of the two needles is accomplished by looper elements preferably in the form of hooks 71, 72, rigidly mounted on a looper carrier 73 slidably mounted in a sleeve-like support 74 which is adapted to not only slide in the support, but to also be rocked or rotated therein. These sliding and rocking motions of the looper carrier are effected by the following instrumentalities: Sleeve-like support 74 is formed in an arm 75 mounted on bed plate 30, and pivoted on said arm is a bell crank lever 76 having one arm thereof provided with a cam roller 77 engaging in the cam slot of cam member 78 which is mounted on shaft 41. The other arm of the bell crank lever has attached thereto a connecting rod 79 which is also attached to a roller 80 secured on what might be termed the rear end of carrier 73 projecting beyond the bearing sleeve 74. As will be apparent, rocking motion of the bell crank lever 76 will impart a reciprocatory motion to the carrier 73 in its bearing 74. Also attached to roller 80 on the looper carrier 73 is a connecting rod 81 attached to a lever 82 pivoted on bracket arm 75 and provided with a cam roller 83 working in the cam groove of a cam member 84 on shaft 41. Thus, rocking motion of lever 82 effected by cam 84 is transmitted by connecting rod 81 to the looper carrier 73. As will hereinafter more fully appear, the reciprocatory motion of the looper carrier 73 is for the purpose of moving the loop of one thread of one needle into the path of the other needle and the rocking motion of the looper carrier is for the purpose of bringing the loopers into positions at the proper time to engage the respective threads of the two needles; to position the loops of the threads in the proper vertical planes, so that they will register with the needle that is to be projected therethrough; and to disengage the looper from the thread at the proper time.

Figure 23:
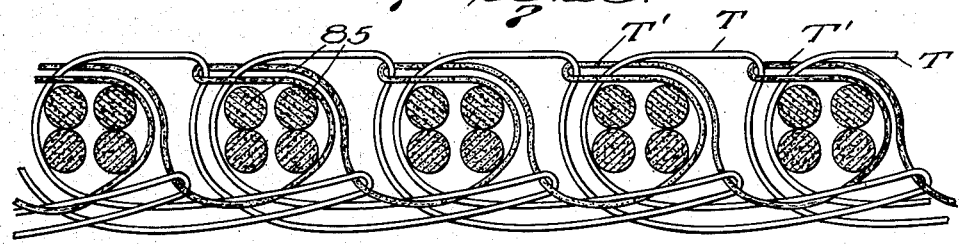
Fig. 23 is a horizontal sectional view through the loops of two pieces of work to be united and Fig. 24 is an elevational view thereof, illustrating, on an enlarged scale, the stitch produced on the present machine.
Figure 24:
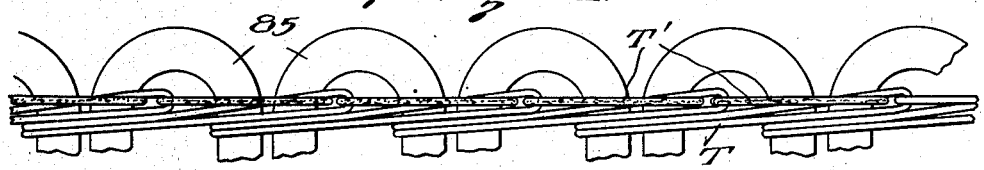

Referring, particularly, to Figs. 15 to 24, wherein the formation of the stitch and a complete cycle of operations of the needles and loopers in the forming thereof, is illustrated, it will be assumed that needle 48 is in its retracted position with respect to the loops of work indicated at 85, and needle 47 in its advanced position, and the looper 71 is shown in position about to engage thread T, and has advanced toward needle 48 which has had the step-over movement imparted to it, as indicated by the dotted arrow line L in Fig. 15. Fig. 17 illustrates looper 71 as having been moved past needle 48 to what is its extreme movement toward the right, as viewed in this figure, during which time it has also been rocked to lower the loop into the path of needle 48, and needle 48 is shown partially advanced with its forward portion projecting through the loop in thread T. The loop in thread T having been thus caught on the needle 48, looper 71 is rocked slightly in the opposite direction or upwardly by the rocking motion of its carrier and the thread released therefrom. It might be stated, for purposes of clarity, that the looper 71, in passing needle 48, also engages thread T' of needle 48, but this is immaterial, and both threads become disengaged from the looper when the looper is rocked, as last mentioned. Continued advance movement of needle 48 carries the thread T' thereof through the loops of the work and, during this movement, needle 47 is being retracted or withdrawn from the work loops. As shown in Fig. 18, the loopers have started their retractive movement toward the left as viewed in Figs. 17 and 18, and looper 72 is about to engage the thread T' of needle 48, as viewed in Fig. 18. Referring to Fig. 19, looper 72 has engaged the thread T' and is drawing the loop formed therein toward needle 47 which, at this time, has almost reached the limit of its retractive movement. In Fig. 20, looper 72 is shown as having carried the loop in thread T' past, but into registry with, needle 47, the looper having been rocked to lower the thread loop somewhat. Needle 47 is also shown as having finished its retractive movement and started its advance movement, having reached a point in its advance movement where its forward end has entered the loop in thread T'. Continued advance of needle 47 and continued retraction of needle 48 is illustrated in Fig. 21 and, as will also be noted in this figure, the direction of movement of the loopers 71, 72, has again been reversed, so that the threads of the needles will be entirely free of looper 72 and these movements continue as indicated in Fig. 22, wherein the several parts are shown as approaching the positions in which they are illustrated in Fig. 15, thus completing the cycle of operations performed in the formation of the present stitch.

It is not deemed necessary to describe, in detail, the threading-up of the sewing mechanism but, as will be appreciated, the tensioning of the threads T, T' is such that the loopers 71, 72, can readily withdraw the thread from the needles during the formation and proper positioning of the successive loops. Thus, no strain is imposed upon the needle itself and, as a consequence, a comparatively small or fine needle, which would ordinarily flex very readily, can be used in the present machine, with the result that the present machine is highly adapted for work of exceedingly fine mesh.

The cycle of operations just described is assumed to have been performed in connection with loops 85 of work present on the work points, under which circumstances the loops formed in the thread T of needle 47, when the latter is advanced, cannot be withdrawn during retraction of the needle by reason of the fact that it is impaled on needle 48 and thread T' is held in proper position by its needle and the loops of work to position it in the path of looper 72. However, in the absence of work on the work points, these conditions would not prevail and the machine could not successfully form the stitches. As a consequence, it is necessary that there be provided means for permitting the needles to properly form stitches in the absence of work on the work points, as this condition actually exists in the normal use of the machine by reason of the spacing of successive pieces of work on the circular series of work points. This continued formation of stitches in the absence of work is known in the art as the forming of a chain stitch, because the successive stitches make up what has the appearance of a chain. In the present instance, this chain stitch device comprises two thread-engaging elements, which might be conveniently termed fingers, which are best seen in Figs. 2, 3 and 7. These fingers indicated at 86, 87, are secured by screws 88 to a bracket 89 mounted on the guard 90 which is usually provided for the purpose of assuring retention of the work loops on the work points as they are brought into operative relationship with the sewing mechanism. These fingers have their free extremities offset downwardly at a point intermediate the two needles 47, 48, and said down-turned portions are preferably of hook formation, in that their opposed edges 91 are concave and their exterior edges 92 convex. Referring to Figs. 21 and 22, wherein only the depending hook-shaped portions of the fingers 86, 87, are shown, it will be observed that, as needle 48 is retracted and withdrawn from the loop of thread T previously impaled thereby, said thread loop will be deposited upon, or caught on, finger 86. This condition is also true of the illustration of Figs. 25 and 26, wherein it will be noted the last loops of a piece of work have passed the sewing needles and the machine has started chaining off. Under these conditions, it will be impossible for that portion of thread T constituting the last-formed loop in said thread to be withdrawn by the thread-tensioning mechanisms or for said loop in said thread to be drawn toward or into the path of needle 47, as indicated in dotted lines in Fig. 25. In other words, if the loop in thread T was not held by stitch finger 86, that loop would be free to be pulled toward needle 47, as viewed in Fig. 25, to a point where it would foul the needle and possibly be picked up by the looper in the next cycle of operations. Stitch finger 87 is on the opposite side of the vertical plane in which the work loops are normally supported on the work points and, in the absence of work on said points, this finger will receive, on its hooked inner face, the thread T', when needle 48 is advanced, as shown in Fig. 26. The thread T' being engaged by the hook of finger 87 insures the portion of the thread lying between said finger and the eye of needle 48 being retained in position to be engaged by the looper for the purpose of forming a loop therein in the absence of work on the work points. Finger 87 also holds the thread T' at a point circumferentially in advance of needle 47. In other words, the presence of finger 87 causes the loop in thread T' to be formed between said finger 87 and the eye of the needle. In the absence of finger 87, and in the absence of work on the work points, it will be impossible for this loop to be formed in thread T'. It should be mentioned that, in the normal operation of the machine, i. e., with work on the work points, the work loops hold thread T' depressed, so that said thread will pass under stitch finger 87, as illustrated in Figs. 19 and 20. It will also be appreciated that, in the absence of work and in the absence of stitch finger 87, there would be nothing to anchor the thread T' at a point far enough in advance of needle 47 to properly form the loop therein. It is for this reason that it has previously been stated that no loop could be formed in the absence of work on the work points if the stitch finger 87 was not present.

Thus, the machine is capable of continuously producing properly formed stitches regardless of whether or not loops of work are on the work points. At the same time, this chaining off operation does not require the presence of the so-called jacks between successive work points in the series of work points, so that extremely fine or narrow points with a minimum space between them can be used for operating on fabrics of exceeding small or fine mesh.

What I claim is:

1. In a sewing machine comprising a series of spaced work-supporting points, the combination of a pair of sewing needles movable through work on said points from opposite sides of the work, a reciprocatory rod, and means on said rod movable transversely of said needles and engageable with threads carried by the needles to form a loop in said threads and position each loop formed in the thread of one needle in the path of the other needle.

2. In a sewing machine comprising a series of spaced work points adapted to receive work to be operated upon, the combination of a pair of thread-carrying needles movable through the work from opposite sides thereof, a pair of hook members, and a member on which both of said hooks are mounted, said member being movable to carry each hook transversely of the paths of said needles from a point adjacent one needle to a point adjacent the other needle in planes to engage the thread of the said one needle and position a loop of said thread in the path of the said other needle.

3. In a sewing machine comprising a series of spaced work-receiving points, the combination of a pair of thread needles, means for advancing and retracting said needles through the work from opposite sides thereof, a slidable member, means for reciprocating said member, means on said member engageable with the threads of said needles to form loops therein and movable to position the loops formed in the thread of each needle in registry with the other needle, and means for rocking said slidable member to facilitate release of the thread loops from said loop-forming means.

4. In a sewing machine comprising a series of work-receiving points, a drive shaft, a pair of thread needles and means operable by said shaft for advancing and retracting said needles through the work from opposite sides thereof, the combination of a looper element for each needle, a supporting member for said looper elements, and means operable by said drive shaft for rocking said supporting member and axially reciprocating said member.

5. In a sewing machine comprising a series of work-receiving points, a drive shaft, a pair of thread needles and means operable by said shaft for advancing and retracting said needles through the work from opposite sides thereof, the combination of a looper hook for each needle, a support in which both said hooks are rigidly mounted, and means operable from said drive shaft for actuating said support to reciprocate and rock said looper hooks.

6. A looper mechanism for sewing machines comprising a carrier, a mounting for said carrier, said carrier being rotatable and slidable axially in its mounting and a pair of looper members mounted on the carrier said looper members being spaced apart transversely of their carrier to accommodate the edges of work material between them.

7. A looper mechanism for sewing machines comprising a carrier, a mounting in which said carrier is supported, said carrier being rotatable and slidable longitudinally of its axis of rotation, and a pair of looper members mounted on the carrier said looper members being spaced apart transversely of their carrier to accommodate the edges of work material between them.

8. In a sewing machine comprising a series of spaced work-supporting points, a pair of thread needles movable through work on the points from opposite sides of the work and looper elements for looping the thread of each needle around the other needle, the combination of a stitch finger for one needle positioned to engage and temporarily retain the loop formed in the thread of its needle in the absence of work on said work points and a second stitch finger engageable with the thread of the other needle to position said thread in the path of the looper for said other needle in the absence of work on the work points.

9. In a sewing machine comprising a series of spaced work-supporting points, a pair of thread needles movable through work on the points from opposite sides of the work and looper elements for looping the thread of each needle around the other needle, the combination of means positioned in spaced relation above the work points to engage and temporarily retain the loop formed by the looper in the thread of one needle in the absence of work on said work points and means positioned in spaced relation above the work points to engage the thread of the other needle for positioning said thread of the other needle in the path of the looper for the other needle in the absence of work on the work points.

10. In a sewing machine comprising a series of spaced work-supporting points, a pair of thread needles movable through work on the points from opposite sides of the work and looper elements for looping the thread of each needle around the other needle, the combination of laterally spaced members positioned above the work points in fixed relation thereto, one of said members being engageable in the loop formed in the thread of one needle and the other member being engageable with the thread of the other needle to position the thread of said other needle in the looper for that needle in the absence of work on the work points.

11. In a sewing machine comprising a continuously moving series of work points, a pair of sewing needles, means for advancing and retracting said needles through work on said points from opposite sides of the work, and means for forming a loop in the thread of each needle while the needle is in its advanced position, the combination of fixed members engageable with the threads of said needles in the absence of work on the work points, one of said fixed members engaging the loop formed in the thread of one needle and the other member engaging the thread of the other needle to position said thread in the path of the loop-forming means of said other needle.

12. In a sewing machine comprising a continuously moving series of work-supporting points, a pair of thread needles movable in opposite directions longitudinally of said points, and looper members for forming loops in the threads of said needles, the combination of fixed members positioned between the two needles in a plane to engage the threads of the needles as the needles are moved longitudinally of the work points, one of said fixed members engaging in the loop of one thread and the other of said needles engaging the other thread to position the latter in the path of the looper member for forming a loop in that thread.

13. In a sewing machine comprising a continuously moving series of work-supporting points, a pair of thread needles movable in opposite directions longitudinally of said points, and looper members for forming loops in the threads of the needles, the combination of oppositely disposed hook-shaped fingers positioned in planes to engage the threads of the respective needles to restrain movement of the threads longitudinally of the work points during the movement of the thread needles longitudinally of the points in the absence of work on the work points.

14. In a sewing machine comprising a continuously moving series of work-supporting points, a pair of thread needles movable in opposite directions longitudinally of said points, and looper members for forming loops in the threads of the needles, the combination of means for limiting movement of the threads longitudinally of the work points in the absence of work on the work points, said means comprising two opposite fingers spaced from each other longitudinally of the work points, said fingers being mounted in fixed position above the work points with portions thereof offset and projecting downwardly into the plane in which the threads are normally moved by the thread needles.

15. In a sewing machine comprising a series of spaced work receiving points, the combination of a pair of thread needles, means for advancing and retracting said needles through the work from opposite sides thereof, a member slidable transversely of the path of said needles, means for reciprocating said member, and means on said member engageable with the threads of said needles to form loops in said threads, said member being movable to position the loops in the thread of each needle in registry with the other needle.

THOMAS H. DE SPAIN.